United States Patent
Kwon

(10) Patent No.: US 10,343,689 B2
(45) Date of Patent: Jul. 9, 2019

(54) INTEGRATED CONTROL METHOD AND SYSTEM OF MOTOR FOR ELECTRIC VEHICLE

(71) Applicant: Hyundai Motor Company, Seoul (KR)

(72) Inventor: Mun Soon Kwon, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 207 days.

(21) Appl. No.: 15/378,899

(22) Filed: Dec. 14, 2016

(65) Prior Publication Data

US 2018/0099672 A1   Apr. 12, 2018

(30) Foreign Application Priority Data

Oct. 7, 2016   (KR) .................. 10-2016-0129483

(51) Int. Cl.

| B60L 1/00 | (2006.01) |
|---|---|
| B60L 3/00 | (2019.01) |
| B60L 15/00 | (2006.01) |
| B60W 10/08 | (2006.01) |
| B60W 10/30 | (2006.01) |

(Continued)

(52) U.S. Cl.
CPC ........... *B60W 30/188* (2013.01); *B60L 1/003* (2013.01); *B60L 3/0061* (2013.01); *B60L 3/0084* (2013.01); *B60L 15/00* (2013.01); *B60W 10/08* (2013.01); *B60W 10/30* (2013.01); *B60W 30/192* (2013.01); *B60W 50/038* (2013.01); *B60L 2240/42* (2013.01); *B60W 2510/083* (2013.01); *B60W 2510/30* (2013.01); *B60W 2710/083* (2013.01); *B60W 2710/30* (2013.01); *Y02T 10/642* (2013.01); *Y02T 10/7275* (2013.01)

(58) Field of Classification Search
None
See application file for complete search history.

(56) References Cited

U.S. PATENT DOCUMENTS

| 4,486,148 A * | 12/1984 | Battah .................. F04B 35/002 417/2 |
|---|---|---|
| 5,923,135 A * | 7/1999 | Takeda ................ B60L 11/1803 318/432 |

(Continued)

FOREIGN PATENT DOCUMENTS

| JP | 2010178403 A | 8/2010 |
|---|---|---|
| JP | 2010200500 A | 9/2010 |

(Continued)

*Primary Examiner* — Navid Ziaeianmehdizadeh
(74) *Attorney, Agent, or Firm* — Slater Matsil, LLP

(57) ABSTRACT

An integrated control method of a motor for a vehicle includes detecting an output torque value of a drive motor and an output torque value of a ventilation system compressor motor by a controller when a vehicle start and a ventilation system are turned on, determining whether an error is occurred in the drive motor and the compressor motor as an output torque value of the drive motor and an output torque value of the ventilation system compressor motor are respectively compared with a drive motor torque reference value and a compressor motor torque reference value which are predetermined by the controller, and adjusting output torque values of the drive motor or the compressor motor depending on a result of determining whether an error is occurred in the drive motor and the compressor motor by the controller.

20 Claims, 4 Drawing Sheets

(51) Int. Cl.
 *B60W 30/188* (2012.01)
 *B60W 30/192* (2012.01)
 *B60W 50/038* (2012.01)

(56) References Cited

U.S. PATENT DOCUMENTS

| | | | | |
|---|---|---|---|---|
| 7,640,744 | B2* | 1/2010 | Rollinger | B60K 6/48 60/605.1 |
| 7,772,791 | B2* | 8/2010 | Lim | H02P 29/60 180/65.285 |
| 8,923,135 | B2* | 12/2014 | Medina | H04N 17/004 370/242 |
| 2009/0024263 | A1* | 1/2009 | Simon, Jr. | B60K 6/485 701/22 |
| 2010/0057283 | A1* | 3/2010 | Worthing | F02D 41/1497 701/22 |
| 2011/0118917 | A1* | 5/2011 | Lim | B60K 6/48 701/22 |
| 2015/0197162 | A1* | 7/2015 | Martin | B60L 11/1861 701/22 |
| 2016/0065038 | A1* | 3/2016 | Lee | B60K 1/00 310/53 |
| 2016/0193991 | A1* | 7/2016 | Apelsmeier | B60H 1/004 701/22 |
| 2017/0203751 | A1* | 7/2017 | Ozono | B60L 11/14 |
| 2017/0349164 | A1* | 12/2017 | Miller | B60K 6/40 |
| 2018/0076743 | A1* | 3/2018 | Chik | H02P 5/74 |

FOREIGN PATENT DOCUMENTS

| | | |
|---|---|---|
| KR | 100361041 B1 | 2/2003 |
| KR | 20060069136 A | 6/2006 |
| KR | 100737014 B1 | 7/2007 |
| KR | 100829305 B1 | 5/2008 |
| KR | 1020130142350 A | 12/2013 |
| KR | 101519256 B1 | 5/2015 |
| KR | 101601491 B1 | 3/2016 |
| WO | 95033629 A1 | 12/1995 |

\* cited by examiner

INTEGRATED CONTROL METHOD AND SYSTEM OF MOTOR FOR ELECTRIC VEHICLE

CROSS-REFERENCE TO RELATED APPLICATIONS

The present application claims priority of Korean Patent Application No. 10-2016-0129483 filed on Oct. 7, 2016, the entire contents of which is incorporated herein for all purposes by this reference.

TECHNICAL FIELD

The present invention relates to an integrated control method and an integrated control system of a motor for a vehicle capable of compensation control of each abnormal motor through integrated control of multiple motors.

BACKGROUND

Recently, in order to realize eco-friendly technology and solve problems such as energy exhaustion, an electric vehicle has emerged as a social issue. The electric vehicle is driven by using the motor receiving electricity from a battery to output power, thereby not emitting carbon dioxide and reducing noise. Furthermore, the energy efficiency of the motor used in the electric vehicle is higher than that of an engine.

Therefore, as the key technology for realizing such the electric vehicle are technologies on batteries and motors, recently, research on the weight saving, miniaturization and short charge time of battery have been actively conducted. Particularly, as a battery should be used in an optimal temperature environment to maintain optimum performance and long life, the battery applied to the electric vehicle is difficult to use in an optimal temperature environment due to the heat generated during driving of the electric vehicle and the temperature change of the outside.

Therefore, in order to solve these thermal problems, a cooling system has been applied to an inverter LDC (low voltage DC converter), OBC (On Board Charger), motor, battery, etc. Among these, the battery is operated through its own cooling system, but the other motor, inverter LDC and OBC are cooled through a separate cooling system.

The cooling system is basically configured so that the power and electronic components are cooled by the drive of a motor operated by the control of a controller. In more detail, the power and electronic components such as a motor and an inverter, etc., are operated with vehicle start-up, and the coolant from a water pump circulates the cooling target components such as a motor, an inverter, etc., along a single cooling line to cool the cooling target components while the electric water pump is also driven depending on the conditions.

Therefore, as the cooling system of the electric vehicle is composed entirely among one cooling line, there has emerged a need for an integrated motor control system considering a water pump, a drive motor, or a compressor motor that circulates the cooling water of the cooling line.

The foregoing is intended merely to aid in the understanding of the background of the present invention, and is not intended to mean that the present invention falls within the purview of the related art that is already known to those skilled in the art.

SUMMARY

Embodiments of the present invention relate to an integrated control method and an integrated control system of a motor for a vehicle capable of compensation control of each abnormal motor through integrated control of multiple motors. Embodiments of the present invention relate have been made in an effort to provide a control method and a control system of a motor for a vehicle having advantages of performing compensation control of a motor when error is occurred in one motor by integrally controlling motors applied to a vehicle.

A control method of a motor for a vehicle according to the present invention may include detecting an output torque value of a drive motor and an output torque value of a ventilation system compressor motor by a controller when a vehicle start and a ventilation system are turned on. It is determined whether an error is occurred in the drive motor and the compressor motor by the controller by comparing an output torque value of the drive motor and an output torque value of the ventilation system compressor motor with a drive motor torque reference value and a compressor motor torque reference value which are predetermined, respectively. Output torque values of the drive motor or the compressor motor are adjusted by the controller depending on a result of determining whether an error is occurred in the drive motor and the compressor motor.

In the determining whether an error is occurred in the drive motor, the controller may determine that an error is occurred in the drive motor if an output torque value of the drive motor is equal to or less than the drive motor torque reference value during a time to be equal to or more than a first reference time which is predetermined.

In the adjusting the output torque value, the controller may decrease an output torque value of the compressor motor as a first ratio which is predetermined if it is determined that an error is occurred in the drive motor depending on a result of determining whether an error is occurred.

In the determining whether an error is occurred in the compressor motor, the controller may determine that an error is occurred in the compressor motor if an output torque value of the compressor motor is equal to or less than the compressor motor torque reference value during a time to be equal to or more than a second reference time which is predetermined.

In the adjusting the output torque value, the controller may decrease an output torque value of the drive motor as a second ratio which is predetermined if it is determined that an error is occurred in the compressor motor depending on a result of determining whether an error is occurred.

In the determining whether an error is occurred in the drive motor, the controller may determine that an error is occurred in the drive motor if an output torque value of the drive motor is equal to or more than the drive motor torque reference value during a time to be equal to or more than a third reference time which is predetermined.

In the adjusting the output torque value, the controller may decrease an output torque value of the drive motor by performing a regenerative braking of the drive motor.

The control method may further include determining whether a communication error is occurred between a water pump motor providing coolant to the drive motor and the controller when a vehicle start is turned on, and adjusting own output torque value by the water pump motor based on a surrounding temperature thereof if it is determined that a communication error is occurred.

In adjusting the output torque value of the water pump motor, the water pump motor may detect a surrounding temperature thereof, and then the water pump motor may be turned off when the temperature is less than a first temperature which is predetermined, an output torque value of the water pump motor may be maintained when the temperature is less than a second temperature which is predetermined and is equal to or more than the first temperature, and an output torque value of the water pump motor may be increased to a maximum value when the temperature is equal to of more than the second temperature.

An integrated control system of a motor for a vehicle according to the present invention may include a drive motor driving a vehicle a compressor motor driving a vehicle ventilation system; and a controller detecting an output torque value of a drive motor and an output torque value of a ventilation system compressor motor when a vehicle start and a ventilation system are turned on, and determining whether an error is occurred in the drive motor and the compressor motor by respectively comparing an output torque value of the drive motor and an output torque value of the ventilation system compressor motor with a drive motor torque reference value and a compressor motor torque reference value which are predetermined, and adjusting output torque values of the drive motor or the compressor motor depending on a result of determining whether an error is occurred.

The controller may decrease an output torque value of the compressor motor as a first ratio which is predetermined if it is determined that an error is occurred in the drive motor depending on a result of determining whether an error is occurred.

The controller may decrease an output torque value of the drive motor as a second ratio which is predetermined if it is determined that an error is occurred in the compressor motor depending on a result of determining whether an error is occurred.

The integrated control system of a motor for a vehicle may further include a water pump motor circulating coolant for a vehicle, and the controller may determine whether a communication error is occurred with the water pump motor when a vehicle stare is turned on and then adjusts an output torque value of the water pump motor if it is determined that a communication error is occurred.

The water pump motor providing coolant to the drive motor may detect a surrounding temperature thereof such that the water pump motor is turned off when the temperature is less than a first temperature which is predetermined, an output torque value of the water pump motor is maintained when the temperature is less than a second temperature which is predetermined and is equal to or more than the first temperature, and an output torque value of the water pump motor is increased to a maximum value when the temperature is equal to of more than the second temperature.

According to the present invention, unlike to a conventional vehicle, reliability of an integrated control system of a motor for a vehicle can be improved, and depending on states of respective motors, compensation control of another motor can be performed by integrally controlling a drive motor and a compressor motor, and simultaneously, determining whether a communication error is occurred between a controller and a water pump motor based on a temperature signal of a water pump motor.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF ILLUSTRATIVE EMBODIMENTS

An exemplary embodiment of the present invention will hereinafter be described in detail with reference to the accompanying drawings.

Figure 4:
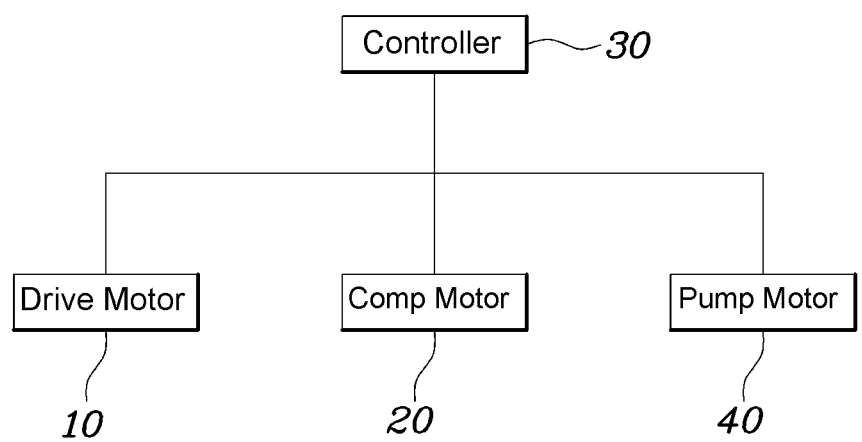
FIG. 4 is a schematic diagram of an integrated control system of a motor for a vehicle according to an exemplary embodiment of the present invention.

A motor applying an integrated control method of a motor for a vehicle according to the present invention basically includes a drive motor 10 driving a vehicle and a compressor motor 20 driving a ventilation system for a vehicle as shown in FIG. 4. Besides, a controller 30 which can simultaneously control the drive motor 10 and the compressor motor 20 is provided, and it is different from a conventional art that two motors can be controlled by one controller 30. (In conventional, an MCU (Motor Control Unit) performs control of operating and cooling a drive motor 10 and an FATC (Full Automatic Temperature Controller) performs control of operating and cooling a ventilation system compressor motor 20 so that controllers 30 controlling the drive motor 10 and the compressor motor 20 are different to each other.)

Integrated control of controlling a plurality of devices by one controller 30 has various merits even though the control type is complex whereby utility thereof has been received attention, and particularly, it is the best merit that even while a problem is occurred to one of the plurality of devices, the problem can be solved by performing compensation control of another device. In also the present invention, a method for solving a problem of a device having an error by performing compensation control of a motor having no error when an error is occurred from the drive motor 10 or the compressor motor 20 is provided, and concretely, FIG. 1 corresponds to a control method being performed in case that an error is occurred from the drive motor 10 and FIG. 2 corresponds to a control method being performed in case that an error is occurred from the compressor motor 20.

Figure 1:
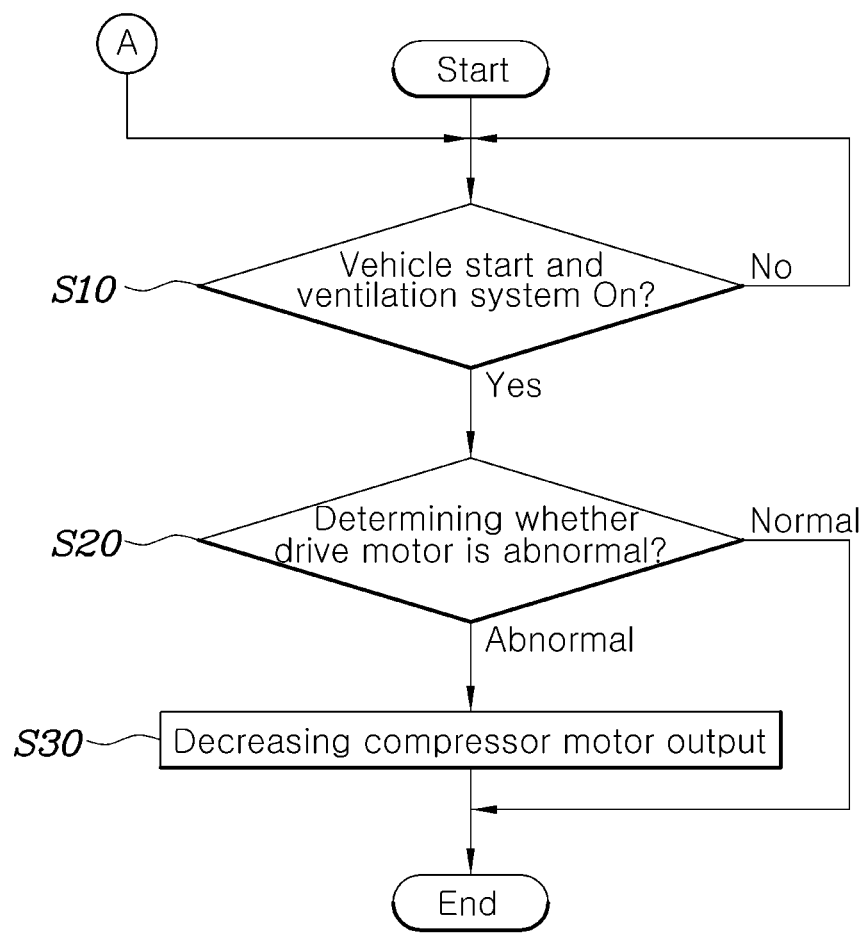
FIG. 1 is a flowchart of an integrated control method of a motor for a vehicle according to a first exemplary embodiment of the present invention.

Firstly, according to a motor integrated control method being performed in case that an error is occurred from the drive motor 10, as shown in FIG. 1, a step S10 of determining whether a vehicle start and a ventilation system are turned on is performed before determining whether an error is occurred to the drive motor 10. In a motor integrated control system according to the present invention, control targets are the drive motor 10 and the compressor motor 20, therefore, the drive motor 10 and the compressor motor 20 must be driven in order to control them. So, at the step S10, it is determined whether the drive motor 10 is driven by determining whether a vehicle start is turned on, and it is determined whether the compressor motor 20 is driven by determining whether a ventilation system is turned on.

If all of a start and a ventilation system are turned on depending on a result of determining, integrated control can be performed by using the drive motor 10 and the compressor motor 20, therefore, a step S20 of determining whether an error is occurred to the drive motor 10 is performed, as shown in FIG. 1. At the step S20, it may be determined whether an error is occurred in the drive motor 10 by comparing an output torque reference value of the drive motor 10 with a drive motor torque reference value which is predetermined, and concretely, it is determined that an error is occurred in the drive motor 10 if an output torque value of the drive motor 10 is equal to or less than the drive motor torque reference value during a time to be equal to or more than a first reference time which is predetermined. In this regard, the first reference time and the torque reference value may be predetermined to various values depending on kind of the drive motor 10 and a demand of a designer, for instance, the first reference time may be predetermined to 2 minutes and the torque reference value may be predetermined to 70% of a torque command value of the drive motor 10. (Herein, the torque command value means a torque value of the drive motor 10 for gaining power required by a user.)

According to a determination reference, if it determined that an error is occurred in the drive motor 10, in consideration of meaning of the torque reference, it corresponds to a case of determining an error of the drive motor 10 as an output torque value of the drive motor 10 is not reached as a demand torque required by a user. In this case, the problem is solved by increasing an output of the drive motor 10, but an output of the drive motor 10 is not more increased in case that there is a limitation of supply electric power for the drive motor 10. Therefore, an output torque value of the compressor motor 20 which is comprised to the ventilation system is controlled so as to be decreased as a first ratio which is predetermined for compensation control in this case, according to the present invention.

Thus, an output torque value of the drive motor 10 can be increased as an output torque value reduced in the compressor motor 20 in a range of limited supply electric power. Herein, the first ratio may be also predetermined variously depending on a demand of a designer. Merely, it is desirable that the first ratio is predetermined about 20% because the ventilation system may be not smoothly operated if the first ratio is to be excessively large. Further, a demand torque value of the compressor motor 20 is to be different depending on a vehicle temperature, therefore, a method of varying the first ratio may be considered.

That is, an output torque value of the drive motor 10 can be instinctively increased through a step S30 of decreasing an output of the compressor motor 20 shown in FIG. 1, and thus a problem occurred in the drive motor 10 may be solved.

Furthermore, at the step of determining whether an error is occurred from the drive motor 10, an error may be occurred as an output torque value of the drive motor 10 is not less than a demand torque value but more than a demand torque value. That is, there is a case that power generated by rotation of the motor is more than power required by a user. The problem of the drive motor 10 may be also determined through the step of comparing an output torque value of the drive motor 10 with the torque reference value as described above, and concretely, the controller 15 determines that an error is occurred in the drive motor 10 if an output torque value of the drive motor 10 is equal to or more than the drive motor torque reference value during a time to be equal to or more than a third reference time which is predetermined. In this regard, the third reference time and the torque reference value of the drive motor 10 may be predetermined to various values depending on a demand of a designer, for instance, the third reference time may be predetermined to 5 minutes and the torque reference value may be predetermined to 110% of a torque command value of the drive motor 10.

Merely, this case is a case that an excessive output torque is generated from the drive motor 10, therefore, the controller 30 decreases an output torque value of the drive motor 10 by performing a regenerative braking of the drive motor 10 and then the reduced output torque value is used for charging a high-voltage battery such that enhancement of fuel consumption of a vehicle can be realized.

Figure 2:
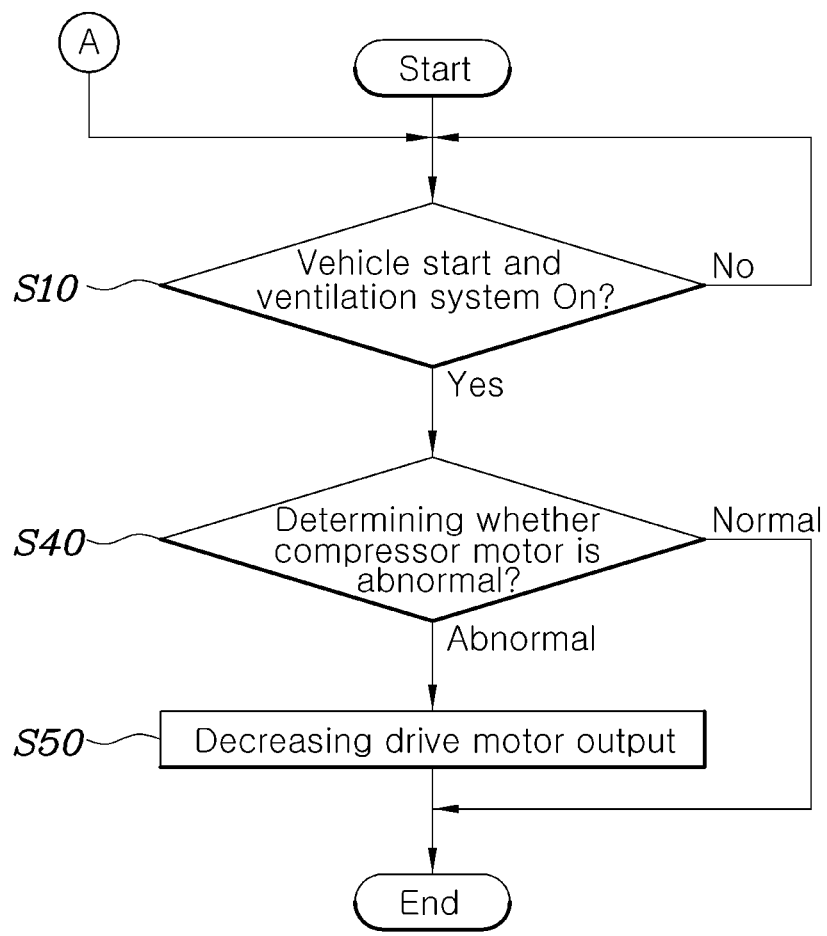
FIG. 2 is a flowchart of an integrated control method of a motor for a vehicle according to a second exemplary embodiment of the present invention.

Differently to above mentioned-cases, there is a case that the drive motor 10 is normal and the compressor motor 20 is abnormal, and a motor integrated control method illustrated in FIG. 2 corresponds to a control method being performed in this case. In the control method of this case, the step S10 of determining whether a vehicle start and the ventilation system are turned on is firstly performed for determining possibility of integrally controlling the drive motor 10 and the compressor motor 20 to be same with the case that an error is occurred in the drive motor 10. Then, it is determined whether the compressor motor 20 is abnormal, and the step S40 of determining whether the compressor motor 20 is abnormal is performed by comparing an output torque value of the compressor motor 20 and the torque reference value of the compressor motor 20 to be similar with the step of determining whether the drive motor 10 is abnormal.

Concretely, the controller 30 determines that an error is occurred in the compressor motor 20 if an output torque value of the compressor motor 20 is equal to or less than the compressor motor torque reference value during a time to be equal to or more than a second reference time which is predetermined. In this regard, the second reference time and the torque reference value of the compressor motor 20 may be also predetermined to various values depending on a specification of the motor and a demand of a designer.

It is determines that the compressor motor 20 is normal depending on a result of determining whether the compressor motor 20 is abnormal at a step S40, an additional compensation control may be not required. But, if an error is occurred in the compressor motor 20 as the above mentioned case that an error is occurred in the drive motor 10, control for solving it is required, and the case of determining that there is an error by the step S40 of determining whether the compressor motor 20 is abnormal also corresponds to the case that an error is occurred as an output torque value of the compressor motor 20 is less than a demand torque value required by a user, therefore, the controller 30 decreases an output torque value of the drive motor 10 as a second ratio which is predetermined through a step S50 of decreasing an output of the drive motor 10 as shown in FIG. 2.

Thus, an output torque value of the compressor motor 20 is instinctively increased through the compensation control. In this regard, the second ratio may be also predetermined to various values depending on a demand of a designer. Merely, in consideration of that it is desirable to decrease an output of the compressor motor 20 about 20% when an error is occurred in the drive motor 10 as described above, it is desirable to decrease an output about only 10% in the drive motor 10 which further influences to a vehicle in comparison with the compressor motor 20.

Hereinbefore, it is confirmed that a motor integrated control for a vehicle is possible by using the motor integrated control method of FIG. 1 and FIG. 2. But, various motors are provided to a vehicle except the drive motor 10 and the compressor motor 20, and there is a water pump motor 40 circulating coolant used to cool a battery for a vehicle as a representative example of the motors.

In the present invention, a system for integrally controlling the water pump motor 40 also is provided, and the water pump motor 40 determines whether to drive depending on a surrounding temperature thereof, and compensation control thereof is not performed depending on output condition of the drive motor 10 or the compressor motor 20, therefore, the water pump motor 40 is controlled by the controller 30 to be same with the drive motor 10 and the compressor motor 20 as shown in FIG. 4, but a concept of compensation control is not applied thereto as shown in FIG. 1 and FIG. 2.

Figure 3:
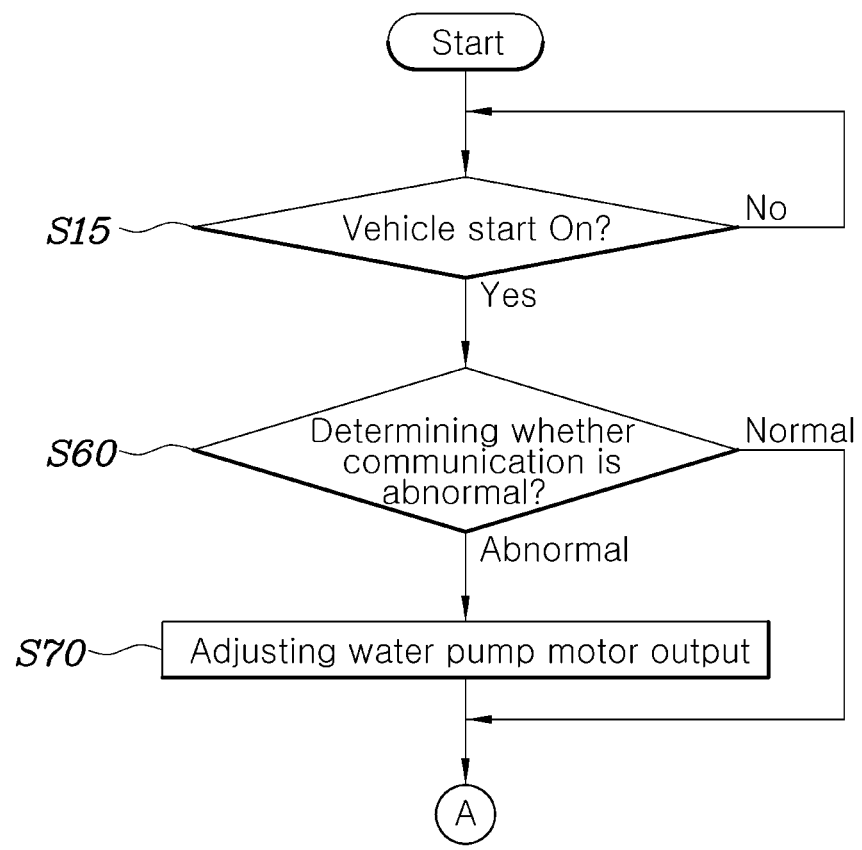
FIG. 3 is a flowchart of an integrated control method of a motor for a vehicle according to a third exemplary embodiment of the present invention.

Merely, referring to FIG. 1 to FIG. 3, a surrounding temperature of the water pump motor 40 is controlled to a suitable temperature for motor control by suitably controlling an output of the water pump motor 40 before performing compensation control of the drive motor 10 and the compressor motor 20, therefore, efficiency and accuracy of compensation control of FIG. 1 and FIG. 2 may be more improved.

The method of controlling the water pump motor 40 shown in FIG. 3 will be concretely described. The water pump motor 40 is driven when a vehicle start is turned on in irrelevant with the ventilation system for a vehicle, therefore, a step S15 of determining whether a vehicle start is turned on is only performed. Then, it is determined whether a communication error is occurred between the water pump motor 40 and the controller 30 because accuracy and efficiency of compensation control of the drive motor 10 and the compressor motor 20 is certainly deteriorated also as the water pump motor 40 is not suitably controlled depending on a surrounding temperature of a vehicle if a communication error is occurred.

Thus, in case of determining that a vehicle start is turned on as shown in FIG. 3, it is determined whether a communication error is occurred between the controller 30 and the water pump motor 40 through the step S60 of determining whether a communication is abnormal. The communication performed between the controller 30 and the water pump motor 40 may be actualized by using various communication types such as CAN, LIN, and PWM, and the controller 30 may transmit a test signal to the water pump motor 40 and determine whether a communication error is occurred between the controller 30 and the water pump motor 40 by analyzing a feedback signal with respect to the test signal.

Depending on the result of determining, the motor integrated control shown in FIG. 1 and FIG. 2 is just performed if it is determined that a communication with the water pump motor 40 is normal, but it may be a problem how to control the water pump motor 40 if it is determined that a communication with the water pump motor 40 is abnormal. To stop the water pump motor 40 because an error is occurred may rapidly increase a temperature such that reliability of integrated motor control is deteriorated. Therefore, in the present invention, a method suitably adjusting an output torque value of the water pump motor 40 though a communication error is occurred between the controller 30 and the water pump motor 40 is provided, and a step S70 of adjusting an output of the water pump motor 40 of FIG. 3 corresponds thereto.

Concretely, at the step S70 of adjusting an output of the water pump motor 40, the water pump motor 40 detects own surrounding temperature, and then the water pump motor 40 is turned off when the temperature is less than a first temperature which is predetermined, an output torque value of the water pump motor 40 is maintained when the temperature is less than a second temperature which is predetermined and is equal to or more than the first temperature, and an output torque value of the water pump motor 40 is increased to a maximum value when the temperature is equal to of more than the second temperature. In this regard, the water pump motor 40 autonomously detects a surrounding temperature thereof as a temperature sensor (not shown) which is mounted in a printed circuit board realizing a circuit for controlling the water pump motor 40 is applied thereto.

That is, the water pump motor 40 detects a surrounding temperature thereof, and then the water pump motor 40 determines that it is not required to drive the water pump motor 40 by determining a state that a temperature of the vehicle drive motor is sufficiently low based on the detected temperature such that the water pump motor 40 is turned off so as to stop driving thereof when the detected temperature is less than the first temperature, and the water pump motor 40 maintains an output torque value of the water pump motor 40 which is driving when the detected temperature is less than the second temperature and is equal to or more than the first temperature, and the water pump motor 40 increases an output torque value of the water pump motor 40 to a maximum value by determining that a temperature of the vehicle drive motor is a high temperature such that a temperature of the drive motor is decreased by coolant when the detected temperature is equal to of more than the second temperature. In this regard, the first temperature and the second temperature may be predetermined to various values depending on a demand of a designer, for instance, the first temperature may be predetermined to 70° C. and the second temperature may be predetermined to 110° C.

According to the present invention, control of the water pump motor 40 can be suitably performed depending on a surrounding temperature through the motor integrated control method shown in FIG. 3 though a communication error is occurred between the controller 30 and the water pump motor 40.

Further, an integrated control system of a motor for a vehicle according to the present invention, as shown in FIG. 4, includes a drive motor 10 driving a vehicle, a compressor motor 20 driving a vehicle ventilation system, a water pump motor 40 circulating coolant for a vehicle, and a controller 30 detecting an output torque value of the drive motor 10 and an output torque value of the compressor motor 20 when a vehicle start and a ventilation system are turned on, and determining whether an error is occurred in the drive motor 10 and the compressor motor 20 by respectively comparing an output torque value of the drive motor 10 and an output torque value of the compressor motor 20 with a drive motor torque reference value and a compressor motor torque reference value which are predetermined, and adjusting output torque values of the drive motor 10 or the compressor motor 20 depending on a result of determining whether an error is occurred, and determining whether a communication error is occurred with the water pump motor 40, and adjusting an output torque value of the water pump motor 40 if it is determined that a communication error is occurred.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An integrated control method of a motor for a vehicle, the method comprising:
   detecting, by a controller, an output torque value of a drive motor and an output torque value of a ventilation system compressor motor when a vehicle starts and a ventilation system are turned on;

determining, by the controller, whether an error has occurred in the drive motor and the compressor motor by comparing an output torque value of the drive motor and an output torque value of the ventilation system compressor motor with a drive motor torque reference value and a compressor motor torque reference value, respectively; and adjusting, by the controller, output torque values of the drive motor or the compressor motor depending on a result of determining whether the error has occurred in the drive motor and the compressor motor;

wherein, determining whether the error has occurred comprises determining that the error has occurred in the drive motor if an output torque value of the drive motor is equal to or less than the drive motor torque reference value during a time that is greater than or equal to a first reference time; and wherein adjusting the output torque values comprises decreasing an output torque value of the compressor motor as a first ratio which is predetermined if it is determined that the error has occurred in the drive motor.

2. The method of claim 1, wherein determining whether the error has occurred in the compressor motor comprises determining that the error has occurred in the compressor motor if an output torque value of the compressor motor is less than or equal to the compressor motor torque reference value during a time that is greater than or equal to a second reference time.

3. The method of claim 1, wherein adjusting the output torque value comprises decreasing an output torque value of the drive motor as a second ratio which is predetermined if it is determined that the error has occurred in the compressor motor.

4. The method of claim 1, wherein determining whether the error has occurred in the drive motor comprises determining that the error has occurred in the drive motor if an output torque value of the drive motor is greater than or equal to the drive motor torque reference value during a time that is greater than or equal to a third reference time.

5. The method of claim 4, adjusting the output torque value comprises decreasing an output torque value of the drive motor by performing a regenerative braking of the drive motor.

6. The method of claim 1, further comprising:
determining whether a communication error has occurred between a water pump motor providing coolant to the drive motor and the controller when a vehicle start is turned on; and
adjusting down output torque value by the water pump motor based on a surrounding temperature thereof if it is determined that the communication error is occurred.

7. The method of claim 6, wherein adjusting the output torque value of the water pump motor comprises detecting the surrounding temperature and then turning the water pump motor off when the surrounding temperature is less than a first temperature, maintaining an output torque value of the water pump motor when the surrounding temperature is less than a second temperature that is greater than or equal to the first temperature, and increasing an output torque value of the water pump motor to a maximum value when the surrounding temperature greater than or equal to the second temperature.

8. An integrated control system of a motor for a vehicle, the system comprising:
a drive motor configured to drive a vehicle;
a compressor motor configured to drive a vehicle ventilation system; and
a controller configured to be connected with a drive motor and a ventilation system compressor motor to detect an output torque value of the drive motor and an output torque value of the ventilation system compressor motor when a vehicle starts and a ventilation system are turned on, to determine whether an error has occurred in the drive motor and the compressor motor by respectively comparing an output torque value of the drive motor and an output torque value of the ventilation system compressor motor with a drive motor torque reference value and a compressor motor torque reference value, and to adjust output torque values of the drive motor or the compressor motor depending on a result of determining whether the error is occurred, wherein the controller is further configured to decrease an output torque value of the compressor motor as a first ratio if the result indicates that the error has occurred in the drive motor.

9. The system of claim 8, wherein the controller is further configured to decrease an output torque value of the drive motor as a second ratio if the result indicates that the error has occurred in the compressor motor.

10. The system of claim 8, further comprising a water pump motor configured to be connected with the controller to circulate coolant for the vehicle, wherein the water pump motor is further configured to determine whether a communication error has occurred with the controller and then to adjust an output torque value thereof based on a surrounding temperature thereof if it is determined that the communication error is occurred.

11. The system of claim 10, wherein the water pump motor is further configured to detect the surrounding temperature such that the water pump motor is turned off when the surrounding temperature is less than a first temperature, an output torque value of the water pump motor is maintained when the surrounding temperature is less than a second temperature that is greater than or equal to the first temperature, and an output torque value of the water pump motor is increased to a maximum value when the surrounding temperature is greater than or equal to the second temperature.

12. An integrated control method of a motor for a vehicle, the method comprising:
detecting, by a controller, an output torque value of a drive motor and an output torque value of a ventilation system compressor motor when a vehicle start and a ventilation system are turned on;
determining, by the controller, whether an error has occurred in the drive motor and the compressor motor by comparing an output torque value of the drive motor and an output torque value of the ventilation system compressor motor with a drive motor torque reference value and a compressor motor torque reference value, respectively;
adjusting, by the controller, output torque values of the drive motor or the compressor motor depending on a result of determining whether the error has occurred in the drive motor and the compressor motor;
determining whether a communication error has occurred between a water pump motor providing coolant to the drive motor and the controller when a vehicle start is turned on; and
adjusting down output torque value by the water pump motor based on a surrounding temperature thereof if it is determined that the communication error is occurred.

13. The method of claim 12, wherein adjusting the output torque value of the water pump motor comprises detecting the surrounding temperature and then turning the water pump motor off when the surrounding temperature is less than a first temperature, maintaining the output torque value of the water pump motor when the surrounding temperature is less than a second temperature that is greater than or equal to the first temperature, and increasing the output torque value of the water pump motor to a maximum value when the surrounding temperature greater than or equal to the second temperature.

14. The method of claim 13, wherein, determining whether the error has occurred comprises determining that the error has occurred in the drive motor if the output torque value of the drive motor is equal to or less than the drive motor torque reference value during a time that is greater than or equal to a first reference time.

15. The method of claim 14, wherein adjusting the output torque value comprises decreasing the output torque value of the compressor motor as a first ratio which is predetermined if it is determined that the error has occurred in the drive motor.

16. The method of claim 12, wherein, determining whether the error has occurred comprises determining that the error has occurred in the drive motor if the output torque value of the drive motor is equal to or less than the drive motor torque reference value during a time that is greater than or equal to a first reference time.

17. The method of claim 12, wherein determining whether the error has occurred in the compressor motor comprises determining that the error has occurred in the compressor motor if the output torque value of the compressor motor is less than or equal to the compressor motor torque reference value during a time that is greater than or equal to a second reference time.

18. The method of claim 12, wherein adjusting the output torque value comprises decreasing the output torque value of the drive motor as a second ratio which is predetermined if it is determined that the error has occurred in the compressor motor.

19. The method of claim 12, wherein determining whether the error has occurred in the drive motor comprises determining that the error has occurred in the drive motor if the output torque value of the drive motor is greater than or equal to the drive motor torque reference value during a time that is greater than or equal to a third reference time.

20. The method of claim 19, adjusting the output torque value comprises decreasing the output torque value of the drive motor by performing a regenerative braking of the drive motor.

* * * * *